W. R. CLARK.
METHOD OF AND MEANS FOR MELTING BRASS AND SIMILAR SCRAP.
APPLICATION FILED AUG. 2, 1918.
1,370,090.
Patented Mar. 1, 1921.
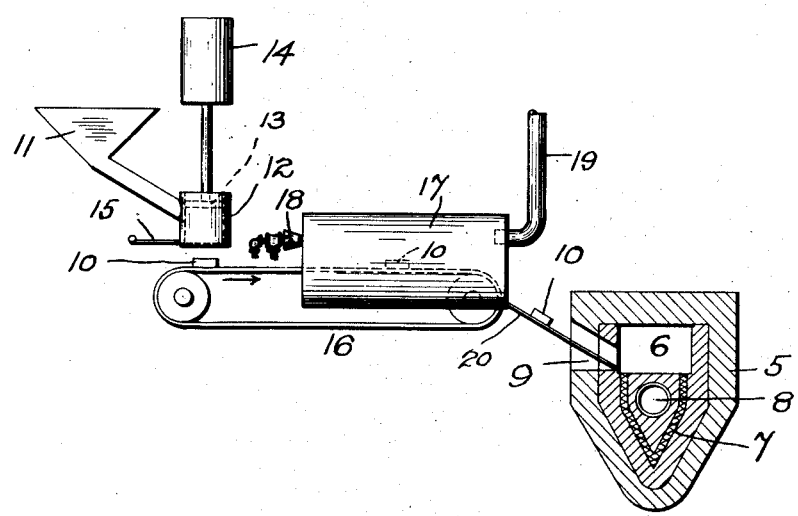

UNITED STATES PATENT OFFICE.

WALTER R. CLARK, OF BRIDGEPORT, CONNECTICUT, ASSIGNOR TO BRIDGEPORT BRASS COMPANY, OF BRIDGEPORT, CONNECTICUT, A CORPORATION OF CONNECTICUT.

METHOD OF AND MEANS FOR MELTING BRASS AND SIMILAR SCRAP.

1,370,090.      Specification of Letters Patent.      Patented Mar. 1, 1921.

Application filed August 2, 1918. Serial No. 247,949.

*To all whom it may concern:*

Be it known that I, WALTER R. CLARK, a citizen of the United States, residing in Bridgeport, in the county of Fairfield and State of Connecticut, have invented certain new and useful Improvements in Methods of and Means for Melting Brass and Similar Scrap, of which the following is a full, clear, and exact description.

In the melting of brass and similar scrap, good results have been obtained by the electric furnace of the induction type, having a secondary consisting of a part of the molten metal of the charge, located adjacent the bottom of or below the main body of the charge, and so arranged as to promote the circulation of the charge by motor effect. Certain difficulties have, however, been encountered in the handling of the scrap to be fed into the furnace, and it has been found, moreover, that the cost of melting metal in a furnace of this kind is rather high.

The primary object of my present invention is to provide a new method of and means for melting brass and similar scrap, whereby these objections are obviated, and the operation of the furnace facilitated, improved and made more efficient.

To these and other ends, the invention consists in the novel features and steps and combinations of parts to be hereinafter described and claimed.

The accompanying drawing shows a diagrammatic side elevation partly in section, of one form of apparatus adapted for the practice of the invention.

I have found that the electric furnace can be more expeditiously charged and operated when the scrap to be melted therein is fed thereto, *i. e.*, charged into the furnace chamber, in the form of briquets or cabbages. When the brass turnings, cuttings and similar chips are shoveled into the furnace in a loose, bulky condition, the air gaps between the particles are so large that difficulty is encountered in establishing the electric circuit. There is a tendency for the upper surface of the metal bath to become chilled and thereby to become hardened or incrusted, which is due in part to the air in the interstices between the fragments of scrap acting as an insulator, which separates them from the bath beneath. In the preferred practice of my invention, I not only overcome this difficulty by charging the material into the furnace chamber in the form of briquets or cabbages, but I also provide means for heating the briquets or cabbages preliminarily before they enter the furnace chamber. This is another feature which expedites the melting in the furnace chamber and increases the economy of the operation, owing to the fact that when the briquets or cabbages have been raised to a moderate degree of heat exteriorly of the furnace, they need be subjected to the heating action of the furnace transformer during only a comparatively short time, and the preliminary heating imparted to the scrap can be produced more economically than preliminary heating in the electric furnace itself could be effected. An ordinary oil burner, for example, will fulfil satisfactorily the required conditions of preliminary heating, and the cost of such heating is, of course, small.

In the practice of my invention, I prefer to use as the main melting means an electric induction furnace of the type wherein a secondary of molten metal is located beneath the body part of the charge or bath and in communication therewith, the arrangement of the channel and furnace body being such that the metal in the bath is circulated by motor effect produced in the channel.

In the drawing, I have shown diagrammatically a furnace of this character, having a body 5 and an interior chamber or hearth 6. The secondary channel beneath the chamber 6 is indicated at 7. The primary core and winding of the transformer are omitted from the drawing, but it will be understood that one leg of the transformer, carrying the primary coil, passes through an opening 8 located between the legs or branches of the channel. The metal to be melted is introduced into the chamber 6 by way of a charging opening 9.

The scrap to be melted, before being introduced into the furnace, is formed into a plurality of cabbages or briquets 10. This may be done by placing the scrap in a hopper 11, through which it runs down into a cylinder 12, in which it is compressed by a piston 13 working in a hydraulic or other fluid pressure cylinder 14. The cylinder or chamber 12 having been filled with the loose scrap, pressure fluid is admitted to the cylinder to bring down the ram or piston 13 and thereby form the material in chamber 12 into a cabbage or briquet, which can then be discharged by opening a door 15 at the lower part of chamber 12.

From the chamber 12 each briquet 10 drops on a conveyer 16, illustrated as an endless belt, which carries such briquet into a muffle or other suitable heating device 17, through which it passes on its way to the electric furnace. The muffle 17 is heated by suitable means, as, for example, an oil burner 18. It incloses a portion of the conveyer so that the briquet, in being carried toward the furnace slowly, has a substantial degree of heat imparted to it before it reaches the furnace. The products of combustion caused by the burning of the oil or other heating medium pass out of the muffle through a stack 19. The briquet, after passing through the muffle, is stripped off of the conveyer onto an inclined slideway 20, on which it slides directly into the chamber 6 of the electric furnace, as shown.

The described arrangement provides in a very simple manner for the expeditious and convenient handling of the material, the elimination to a large degree of the objectionable air spaces in the charge, which cause poor conductivity, and the pre-heating of the charge while being mechanically fed to the electric furnace, whereby the economy of the installation is considerably increased.

My invention is of particular utility in connection with the melting of brass or other scrap in an electric furnace of the induction type having a molten secondary below the level of the charge, because in a furnace of that type the main heating effect is transmitted to the charge from beneath and the upper surface of the charge is apt to become incrusted if the scrap is charged into the furnace chamber in a loose condition, owing to the thermal insulation provided by the air in the interstices between the chips and the oil or dirt which is frequently present. By briqueting the scrap, as herein described, I not only obtain greater convenience in handling the material and am enabled to melt a larger quantity of material at one time, but the thermal insulation within the upper part of the charge is reduced considerably. The heat from beneath can therefore pass readily through the upper portion of the charge where, in view of the character of the furnace, this condition is necessary, and the incrustation of the upper part of the charge is reduced to a certain degree, if not altogether eliminated.

Various changes may be made in the procedure and apparatus herein described without departing from the scope of my invention as defined in the claims.

I do not claim broadly herein the method of melting brass and similar scrap, which comprises advancing the scrap slowly toward and into an electric furnace and pre-heating the scrap during such slow advance, as claimed in my application Serial No. 239,742, filed June 13, 1918.

What I claim is:

1. The method of melting brass and similar scrap in the form of loose chips and cuttings, which comprises cabbaging the scrap and then introducing it into an electric furnace.

2. The method of melting brass and similar scrap in the form of loose chips and cuttings, which comprises, first, cabbaging the scrap, then pre-heating the same and then introducing it into an electric furnace.

3. The method of melting brass and similar scrap in the form of loose chips and cuttings, which comprises cabbaging the scrap, advancing the cabbages slowly toward and into an electric furnace, and pre-heating the cabbages while they move toward the furnace.

4. The method of melting brass and similar scrap, which comprises, first, cabbaging the scrap, then moving the cabbages through a muffle to pre-heat the same, and then introducing the pre-heated cabbages into an electric furnace.

5. The method of melting brass and similar scrap in an electric furnace having a molten secondary below the level of the charge, which comprises cabbaging the scrap, then introducing it into the electric furnace chamber, and then melting it by inducing an electric current therein.

6. In the method of melting brass and similar scrap in an electric furnace of the induction type having a molten secondary below the level of the charge, the step of cabbaging the scrap prior to its introduction into the furnace chamber, whereby the body of scrap in which electric current is induced in the chamber is condensed at its upper part for the reduction or elimination of incrustation due to insulation between the particles.

7. In the method of melting brass and similar scrap in an electric furnace of the induction type having a molten secondary below the level of the charge, forming the scrap into compressed briquets or cabbages, introducing them into the electric furnace chamber, and then inducing a heating current in the charge from beneath, the heating effect in the upper part of the charge being increased to prevent or reduce incrustation by the condensed form of the scrap in such upper part of the charge.

8. The combination with an electric furnace, of a device for compressing scrap metal and forming it into briquets, and means to transfer the briquets from said briqueting device to the furnace chamber.

9. The combination with an electric furnace, of a device for compressing scrap metal and forming it into briquets, means for transferring the briquets from the briqueting device to the furnace chamber, and a preheating device located externally of the furnace for heating the briquets during such transfer.

10. The combination of an electric furnace, of a device for compressing scrap metal and forming it into briquets, and a conveyer for moving the briquets to the furnace chamber, said conveyer so arranged that the briquets fall on the same as they are discharged from the briqueting device.

11. The combination of an electric furnace, of a device for compressing scrap metal and forming it into briquets, and a conveyer for moving the briquets to the furnace chamber, said conveyer so arranged that the briquets fall on the same as they are discharged from the briqueting device and said electric furnace being so arranged as to receive the briquets in the chamber thereof as they are discharged from said conveyer.

12. The combination with an electric furnace of the induction type for melting scrap metal, of a conveyer for carrying briquets to the same, means for forming briquets of metal scrap and placing them on said conveyer, and a muffle through which the conveyer passes.

13. The method of melting brass and similar scrap, which comprises cabbaging the scrap, then placing it on a conveyer whereby it is moved toward an electric furnace, preheating the cabbages during their travel on said conveyer, discharging the cabbages into the furnace chamber, and then melting the cabbages in the furnace chamber, by inducing current therein.

In witness whereof, I have hereunto set my hand, on the 31 day of July, 1918.

WALTER R. CLARK.